Feb. 6, 1923.
A. G. JONES.
LOCK FOR LEVERS.
FILED DEC. 10, 1920.
1,444,379.
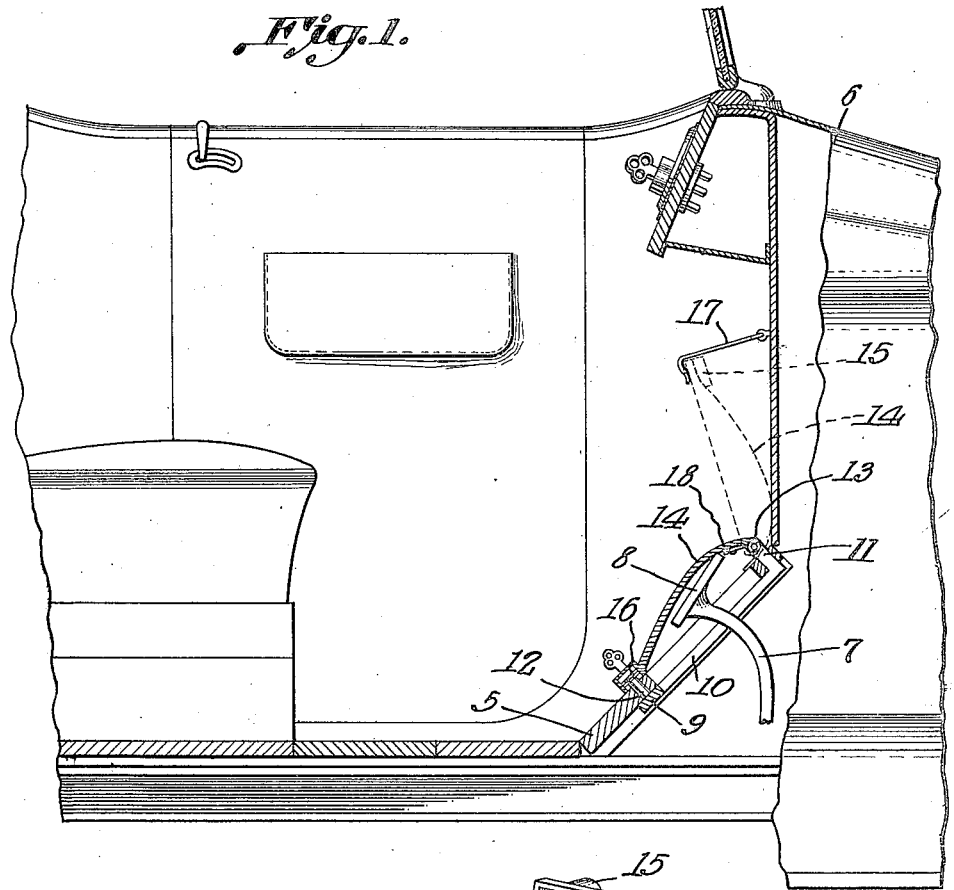
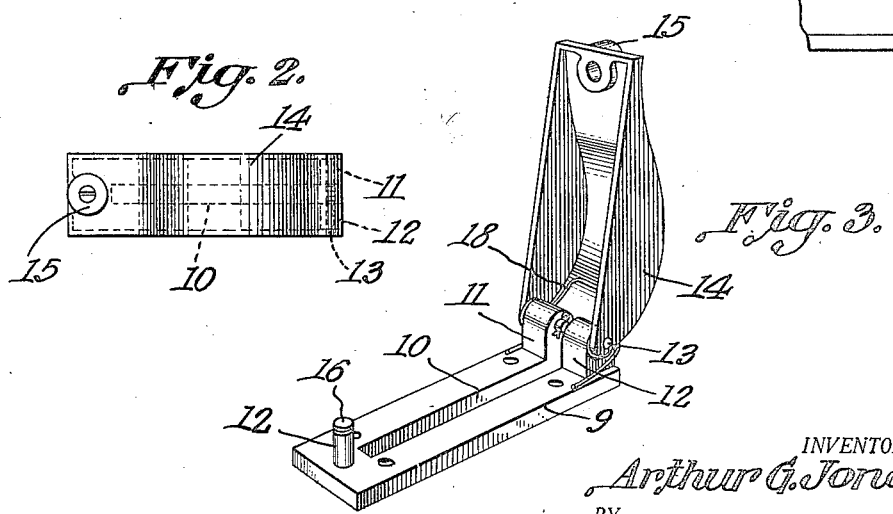
INVENTOR.
Arthur G. Jones
BY
David Pelton Moore
ATTORNEY.

Patented Feb. 6, 1923.

1,444,379

UNITED STATES PATENT OFFICE.

ARTHUR G. JONES, OF DETROIT, MICHIGAN.

LOCK FOR LEVERS.

Application filed December 10, 1920. Serial No. 429,639.

*To all whom it may concern:*

Be it known that I, ARTHUR G. JONES, a citizen of the United States, residing at Detroit, in the county of Wayne and State of Michigan, have invented certain new and useful Improvements in Locks for Levers, of which the following is a specification, reference being had therein to the accompanying drawing.

This invention relates to improvements in safety devices for locking the clutch pedals of automobiles, one object of the invention being the provision of a simple device adapted to be attached to the foot boards of an automobile and so disposed as to embrace the clutch pedal when fully depressed to lock the same in such position with the clutch thus thrown out so that the car cannot be operated even though the engine can be started.

A further object of this invention is the provision of a novel arrangement of supporting members with a pivoted hood covering, which when not in use is extended to be connected by a catch to the cowl at the rear of the engine within the automobile body but to be readily released to fall over and encase the pedal portion of the clutch lever where the same can be locked in any desired manner by the owner of the car.

A still further object of this invention is the provision of a device of this character which is simple and durable in construction and thoroughly efficient and practical in use.

In the accompanying drawings:

Figure 1 is a view partly in section of the front portion of an automobile body, showing the present device attached thereto, full lines indicating the same in clutch locking position, while dotted lines indicate its position when not in use.

Figure 2 is a top plan view of the device per se.

Figure 3 is a perspective view of the same.

Referring to the drawings, the numeral 5 designates the foot board of the automobile, and 6 the cowl, there being mounted as usual to project through the foot board, the clutch lever 7 having the foot pedal 8. The present device consists of a bar 9 provided with a slot 10 which straddles the lever 7, while the two lugs 11 and 12 thereof project through the floor lever. Pivoted at 13 to the lugs 11 and 12 is a hood 14 for covering the clutch pedal, the eye 15 being adapted to cooperate with the end 16 of the lug 12 to form a lock, it being possible to use with this construction, a patent lock or to have a pin lock connection at this point, the matter of locking being unimportant.

When the lever is not in use, a catch 17 is carried by the cowl and is adapted to receive the free end or eye 15 to hold the same in out of use position.

In applying the present device, it is attached to the foot board below the same so that the pedal covering hook is exterior or on the upper side and it is so constructed as to be readily applied to any type of automobile.

If desired a spring may be used to raise the hood 14 and hold it against accidental disengagement from the catch 17.

What I claim as new is:

The combination with a supporting member and a foot depressed clutch pedal, of means for holding the pedal depressed including a slotted bar for straddling the pedal below the first support, a pair of lugs carried thereby and projecting through the first support upon the upper face thereof, a third lug carried by the slotted bar and projecting through the first support, a pedal covering hood pivoted at one end to the pair of said lugs, and cooperative locking means carried by the hood and the third lug.

In testimony whereof I affix my signature.

ARTHUR G. JONES.